(12) United States Patent
Ronot et al.

(10) Patent No.: US 10,209,401 B2
(45) Date of Patent: *Feb. 19, 2019

(54) METHOD FOR VALIDATING A TRAINING IMAGE FOR THE MULTIPOINT GEOSTATISTICAL MODELING OF THE SUBSOIL

(75) Inventors: Cyril Ronot, Pau (FR); Philippe Ruelland, Pau (FR); Pierre Biver, Pau (FR)

(73) Assignee: TOTAL SA, Courbevoie (FR)

( * ) Notice: Subject to any disclaimer, the term of this patent is extended or adjusted under 35 U.S.C. 154(b) by 1133 days.

This patent is subject to a terminal disclaimer.

(21) Appl. No.: 14/348,353

(22) PCT Filed: Jul. 24, 2012

(86) PCT No.: PCT/FR2012/051758
§ 371 (c)(1),
(2), (4) Date: Mar. 28, 2014

(87) PCT Pub. No.: WO2013/045776
PCT Pub. Date: Apr. 4, 2013

(65) Prior Publication Data
US 2014/0244227 A1 Aug. 28, 2014

Related U.S. Application Data

(60) Provisional application No. 61/541,260, filed on Sep. 30, 2011.

(51) Int. Cl.
*G06G 7/48* (2006.01)
*G01V 99/00* (2009.01)
(Continued)

(52) U.S. Cl.
CPC ............ *G01V 99/005* (2013.01); *G01V 1/282* (2013.01); *G06N 99/005* (2013.01); *G06T 17/05* (2013.01); *G01V 2210/665* (2013.01)

(58) Field of Classification Search
CPC .... G01V 99/005; G01V 1/282; G01N 99/005; G06F 17/10
(Continued)

(56) References Cited

U.S. PATENT DOCUMENTS 7,630,517 B2   12/2009   Mirowski et al.
8,422,745 B2*  4/2013    Hu ........................... G01V 1/30
                                                              382/109
(Continued)

FOREIGN PATENT DOCUMENTS

CN    101706966 A    5/2010
CN    101727578 A    6/2010
(Continued)

OTHER PUBLICATIONS

Sebastien Strebelle, "Conditional Simulation of Complex Geological Structures Using Multiple-Point Statistics[1]", *Mathematical Geology*, vol. 34. No. 1, Jan. 2002 (© 2002), pp. 1-21.
(Continued)

*Primary Examiner* — Andre Pierre Louis
(74) *Attorney, Agent, or Firm* — Patterson Thuente Pedersen, P.A.

(57) ABSTRACT

According to the invention, a training image denotes, for each cell of a first three-dimensional grid, a respective type of geological facies assigned to said cell. For each cell of a second three-dimensional grid, the morphology of which is matched to estimated geological horizons, the well data comprise a respective type of geological facies estimated for said cell. Two-dimensional patterns, each of which is defined along a respective geological horizon and includes, in a cell containing the intersection of a well with said geological horizon, the type of geological facies estimated for each cell, are defined. The instances of the identified two-dimensional patterns are counted in the training image so as to verify the
(Continued)

ability of the training image to account for correlations between wells.

7 Claims, 10 Drawing Sheets

(51) Int. Cl.
　　　*G01V 1/28*　　(2006.01)
　　　*G06T 17/05*　　(2011.01)
　　　*G06N 99/00*　　(2010.01)
(58) Field of Classification Search
　　　USPC .............................................. 703/6
　　　See application file for complete search history.

(56) References Cited

U.S. PATENT DOCUMENTS

| | | |
|---|---|---|
| 2006/0041410 A1 | 2/2006 | Strebelle |
| 2007/0014435 A1 | 1/2007 | Mirowski et al. |
| 2008/0195319 A1 | 8/2008 | Wilkinson et al. |
| 2009/0164182 A1 | 6/2009 | Pedersen et al. |
| 2009/0260880 A1* | 10/2009 | Thambynayagam ... E21B 43/00 175/45 |
| 2009/0262603 A1 | 10/2009 | Hurley et al. |
| 2010/0272324 A1 | 10/2010 | Hu et al. |
| 2010/0332205 A1* | 12/2010 | Tillier .................. G01V 11/00 703/10 |
| 2011/0004447 A1 | 1/2011 | Hurley et al. |
| 2011/0004448 A1 | 1/2011 | Hurley et al. |
| 2011/0213600 A1 | 9/2011 | Strebelle |

FOREIGN PATENT DOCUMENTS

| | | |
|---|---|---|
| FR | 2905181 A1 | 2/2008 |
| FR | 2944905 A1 | 10/2010 |
| WO | WO2006/023597 A2 | 3/2006 |

OTHER PUBLICATIONS

Chugunova et al., "Multiple-Point Simulations Constrained by Contnuous Auxiliary Data", *Math Geosci* (2008), 40: 133-146, DOI 10.1007/s11004-007-9142-4, pp. 133-146.

Boisvert et al., "Multiple-Point Statistics for Training Imag Selection", *Natural Resources Research*, vol. 16, No. 4, Dec. 2007 (© 2008), DOI: 10.1077/s11053-008-9058-9, pp. 313-321.

Roerdink et al., "The Watershed Transform: Definitions, Algorithms and Parallelization Strategies", *Fundamenta Informaticae 41*, (2001) 187-228, IOS Press., pp. 1-40.

Zhang, "Incorporating Geological Conceptual Models and Interpretations into Reservoir Modeling Using Multiple-Point Geostatistics", *Earth Science Frontiers*, 2008, 15(1): 26-35, Online English Edition of the Chinese Language Journal, 9 Pgs.

Alcolea, et al., "Blocking Moving Window Algorithm: Conditioning multiple-point simulations to hydrogeological data", *Water Resources Research*, vol. 46, W08511, doi:10.1029/2009WR007943, 2010, 18 Pgs.

Canny, "A Computational Approach to Edge Detection", *IEEE Transactions on Pattern Analysis and Machine Intelligence*, vol. PAMI-8, No. 6, Nov. 1986, pp. 679-698.

* cited by examiner

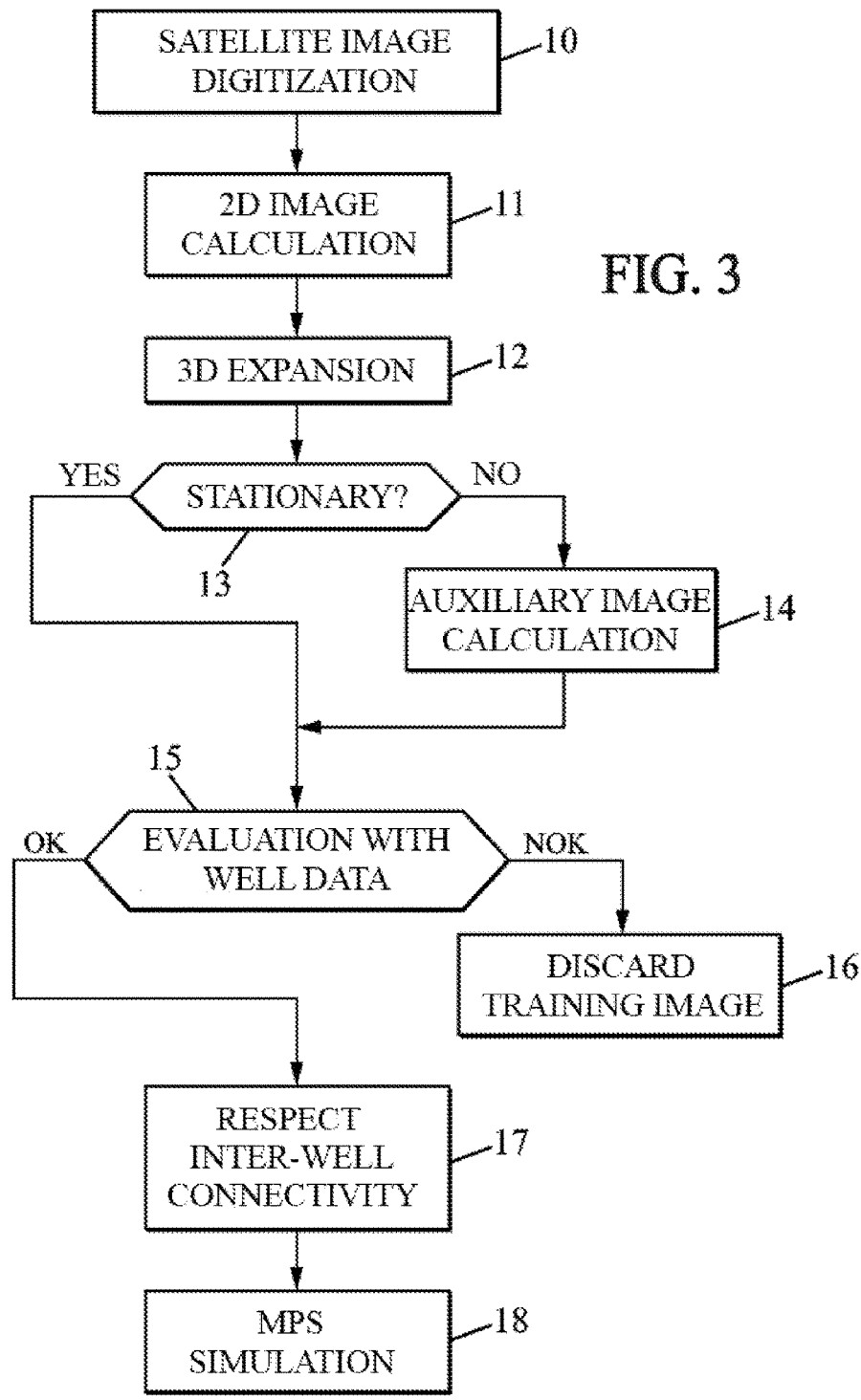

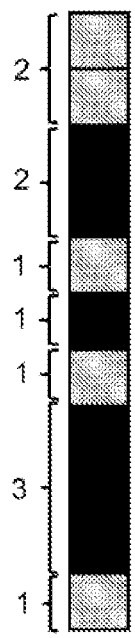 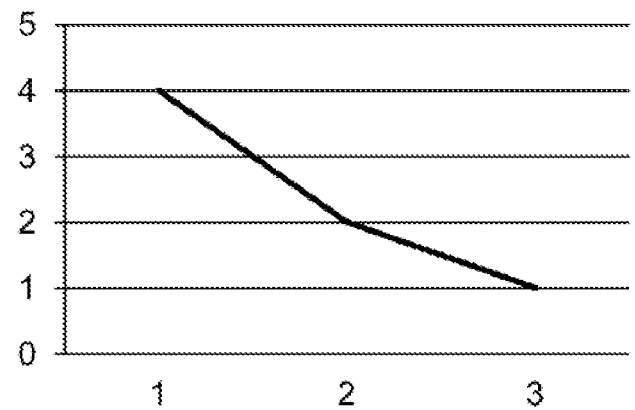
FIG. 8A                FIG. 8B
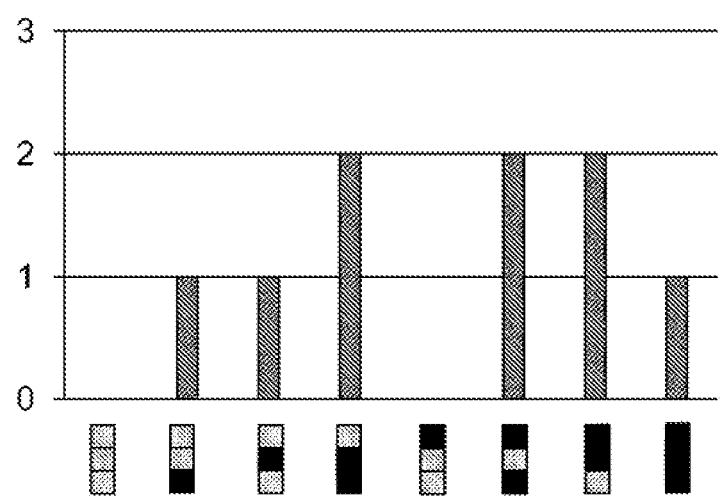
FIG. 9

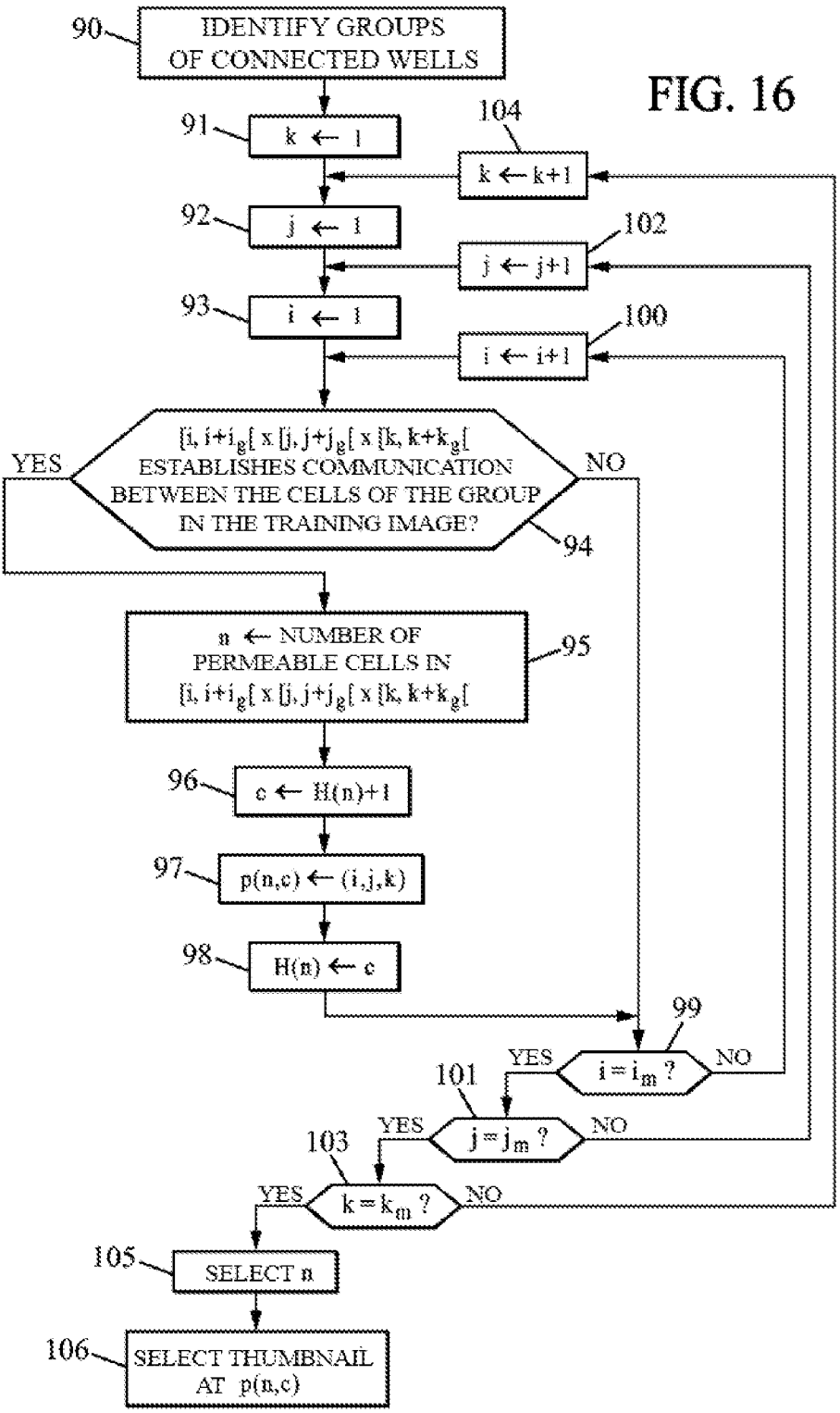

METHOD FOR VALIDATING A TRAINING IMAGE FOR THE MULTIPOINT GEOSTATISTICAL MODELING OF THE SUBSOIL

PRIORITY CLAIM

The present application is a National Phase entry of PCT Application No. PCT/FR2012/051758, filed Jul. 24, 2012, which claims priority from U.S. Patent Application No. 61/541,260, filed September, 2011, said applications being hereby incorporated by reference herein in their entirety.

FIELD OF THE INVENTION

The present invention relates to multipoint geostatistical techniques used to construct geological models to represent areas of the subsoil.

BACKGROUND OF THE INVENTION

Geological models are very useful tools for studying the subsoil, especially for oil field exploration or exploitation. One attempts to build a geological model that best represents the structure and behavior of a reservoir from measurements conducted on the surface (especially seismic measurements) or in wells (logs), or from observations made on core samples taken from the wells. Of course, even when large numbers of measurements and samples are collected, construction of a three-dimensional model that faithfully reflects the structure and behavior of the studied area of the subsoil is not a realistic goal. This is why statistical methods are used to construct these models.

Traditional geostatistical methods are based on the use of variograms which are measurements of spatial variability at two points. These traditional methods are very limited, especially in their ability to represent the sometimes complex topology of the area studied. Multipoint methods have been proposed since the 1990s to overcome these limitations.

Multipoint statistics (MPS) techniques are used to model geological heterogeneities in a manner that reproduces natural systems while better reflecting the uncertainties of the model.

The data input of MPS simulation techniques include training images whose selection plays an important role in the reliability of the model obtained. A training image is defined in a three-dimensional grid (3D). It is chosen so that it represents patterns of geological heterogeneities that one can expect to encounter in the reservoir (see S. Strebelle, "Conditional Simulation of Complex Geological Structures Using Multiple-Point Statistics", Mathematical Geology, Vol. 34, No. 1, 2002, p. 1-21).

In the early days of the MPS technique, a stationary training image was used defining a conceptual representation of a sedimentary system, obtained from a sketch drawn by a geologist or from an object-based simulation. Newer algorithms allow MPS simulations using non-stationary training images, combining them with auxiliary training images (see T. L. Chugunova & L. Y. Hu, "Multiple-Point Simulations Constrained by Continuous Auxiliary Data", Mathematical Geosciences, Vol. 40, No. 2, 2008, pp. 133-146).

Training images can correspond to a simplified representation of a contemporary analogue, obtained by an image processing technique applied to satellite photographs of a region of the world which, in the opinion of geological experts, has characteristics similar to those of the region with previously formed sedimentary deposits found within the subsoil study area. For example, various satellite images are processed and then stacked to form a three-dimensional representation which will serve as a training image.

Often, the study of a particular geological area includes drilling one or more wells in this area in order to collect measurements (logs) and/or samples. It is then possible to verify whether the 3D training image seems to be consistent with the well data available, in order to validate the training image or indicate that it needs to be modified. A training image which is not consistent with the well data is likely to provide a poor representation of the heterogeneities during simulations.

Methods for the validation of vertical heterogeneities in training images have been proposed by J. B. Boisvert, J. Pyrcz and C. V. Deutsch, in "Multiple-Point Statistics for Training Image Selection", Natural Resources Research, Vol. 16, No. 4, December 2007, p. 313-320. Multipoint statistics such as the multipoint density function (MPDF) are calculated along a dimension based on the well data and on the training image. If there is a good correspondence between the two MPDF functions, the training image is considered to be consistent with the well data.

An object of the present invention is to enhance the methods for generating and validating training images. It is desirable to be able to validate a training image relative to well data without being limited to statistical estimates parallel to a well.

SUMMARY OF THE INVENTION

The invention proposes a method for preparing a training image for modeling an area of the subsoil by a multipoint geostatistical technique. This method comprises:
  constructing a training image on a first three-dimensional grid of cells, the training image giving, for each cell of the first three-dimensional grid, a respective type of geological facies assigned to said cell; and
  verifying the representativeness of the training image with respect to well data obtained based on observations conducted in a plurality of wells drilled in the area of the subsoil, the well data referring to a second three-dimensional grid of cells having a morphology adapted to estimated geological horizons in the area of the subsoil, the well data including the types of geological facies, that are respectively estimated from the observations for the cells of the second three-dimensional grid which are located along the wells.

The verification of representativeness of the training image with respect to the well data includes an inter-well verification which comprises:
  identifying two-dimensional patterns in the well data, each two-dimensional pattern being defined along a respective geological horizon and including, in a cell containing the intersection of a well with said geological horizon in the second three-dimensional grid, the type of geological facies estimated for this cell; and
  counting, in the training image, occurrences of the two-dimensional patterns identified.

The verification of representativeness of the training image with respect to the well data is not limited to a vertical verification. A lateral verification is conducted to exploit the information provided by correlations from one well to another, through an analysis based on two-dimensional patterns which can be identified for groups of M neighboring wells, M being a chosen integer that is greater than 1. This also increases the probability that the model to be generated by the MPS technique suitably represents the study area of the subsoil.

The inter-well verification may include validating the training image when the counted number of occurrences of the identified two-dimensional patterns exceeds a threshold; said threshold may be expressed in proportion to the number of possible positions of the two-dimensional pattern in the training image.

In one embodiment, the position of each two-dimensional pattern defined for wells intersecting a geological horizon is identified by the position of the cell of the second three-dimensional grid containing the centroid of these wells along the geological horizon under consideration. The counting, in the training image, of the occurrences of a two-dimensional pattern positionally identified by the position of a centroid cell can then comprise:

scanning the training image, each scanning step placing the two-dimensional pattern on the first three-dimensional grid by aligning the cell containing the centroid of the wells over a reference cell of the first three-dimensional grid and the cells of the two-dimensional pattern respectively containing the intersections between the wells and the geological horizon over target cells of the first three-dimensional grid; and incrementing a counter each time a scanning step results in the types of facies estimated for the cells of the two-dimensional pattern coinciding with the types of facies respectively assigned to the target cells in the training image.

The verification of representativeness of the training image with respect to the well data may be supplemented with an intra-well verification comprising:

estimating a multipoint statistical measurement, such as a multipoint density function (MPDF) or a distribution of runs, along each well in the well data;

estimating the same multipoint statistical measurement along vertical columns of the first three-dimensional grid of cells; and comparing the two estimated multipoint statistical measurements.

Another aspect of the invention relates to a data processing system suitable for preparing a training image for modeling an area of the subsoil by a multipoint geostatistical technique. The system comprises computer resources configured to implement a method as defined above.

Yet another aspect of the invention relates to a computer program for a data processing system, the program comprising instructions for implementing a method as defined above when it is executed on a processing unit of the data processing system. A computer-readable storage medium on which such a program is stored is also proposed.

BRIEF DESCRIPTION OF THE DRAWINGS

Other features and advantages of the present invention will become apparent from the following description of an exemplary non-limiting embodiment, with reference to the accompanying drawings, in which:

FIG. 3 is a flowchart of an embodiment of a method according to the invention;

FIGS. 8A-B are diagrams illustrating a first example of a multipoint statistical measurement;

FIG. 9 is a diagram illustrating a second example of a multipoint statistical measurement;

FIG. 16 is a flowchart showing one way of implementing the technique illustrated in FIGS. 13-15.

DETAILED DESCRIPTION OF THE DRAWINGS

Multipoint statistics techniques (MPS) were developed over the past twenty years. Facies of the geological area to be analyzed are modeled pixel by pixel on a grid of three-dimensional cells having a morphology that is adapted to the geological horizons in the area to be modeled. This 3D grid is called a reservoir grid. MPS simulation assigns to each pixel in the reservoir grid a facies value, for example an integer, corresponding to a code indicating what types of facies are expected to be found in the area to be modeled. For example, in a fluvial environment, the types of facies can be channel, alluvial plain, sandy deposit, crevasse splay, etc.

The implementation of an MPS technique requires a 3D training image whose statistical content is representative of the area being modeled. This training image is typically defined over a first regularly shaped three-dimensional grid of cells, and contains statistical information on the sedimentary facies at the geobody scale.

The MPS simulation may consist of passing a rectangular window over the training image, identifying the different facies configurations encountered, and organizing them into a search tree or list. Then, from the cells of the reservoir grid that are initially filled in (for example based on well samples), the algorithm traverses the reservoir grid and collects compatible configurations in the search tree then pulls facies values from these configurations according to their probability distribution function. It thus constructs step by step a reservoir model in which the spatial facies correlations are statistically similar to those of the training image.

Of course, the quality of the model depends heavily on the ability of the training image to suitably represent the statistics of the modeled area.

Figure 1:
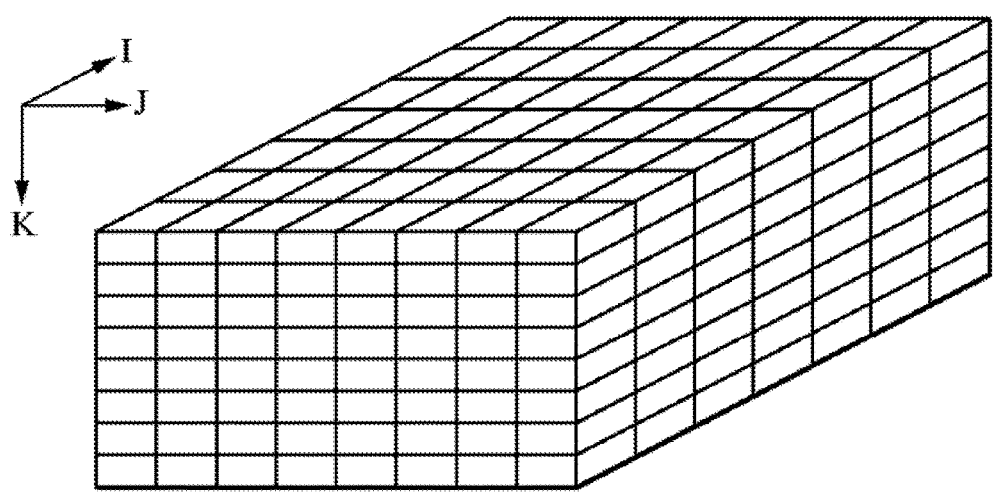
FIGS. 1 and 2 are schematic illustrations of a regular grid and a reservoir grid, respectively.

A regular grid of cells such as the grid illustrated in FIG. 1 is a three-dimensional matrix in the shape of a rectangular parallelepiped, containing a certain number of identically sized cells each in the shape of a rectangular parallelepiped. Each cell is referenced by its position I, J, K, within a reference system, where I and J are horizontal indexes and K is an index indicating the layer among a plurality of vertically stacked layers.

Figure 2:
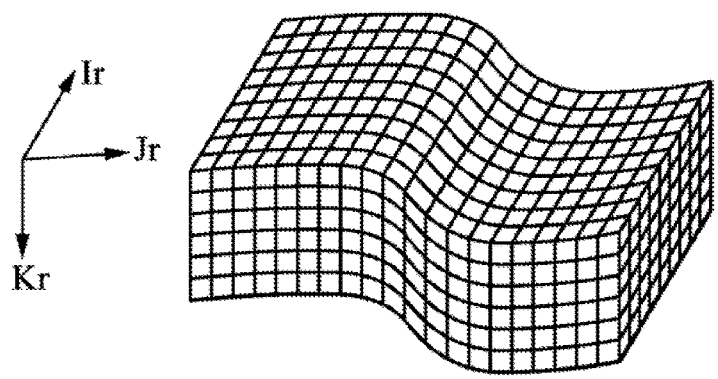
Figure 4C:
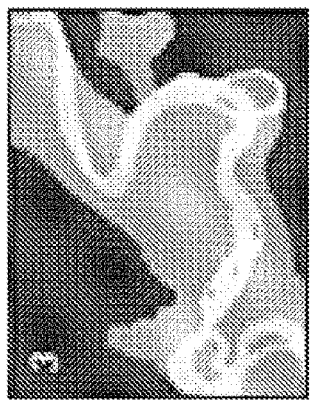
FIGS. 4A-4E show examples of satellite images preprocessed for assembly in a three-dimensional training image.
Figure 4E:
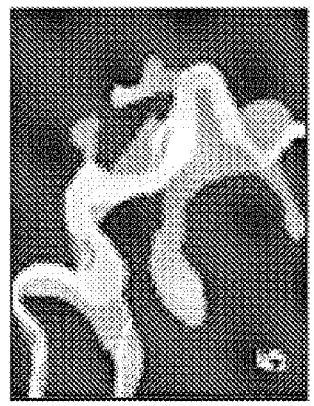
Figure 4B:
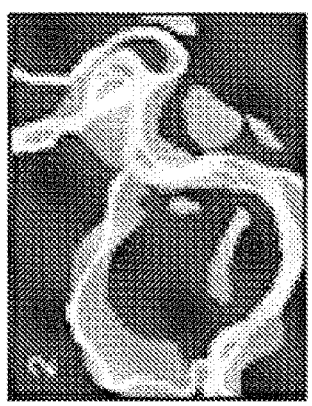
Figure 4D:
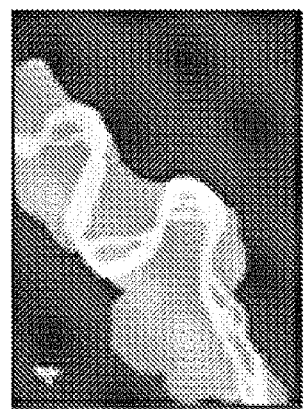
Figure 4A:
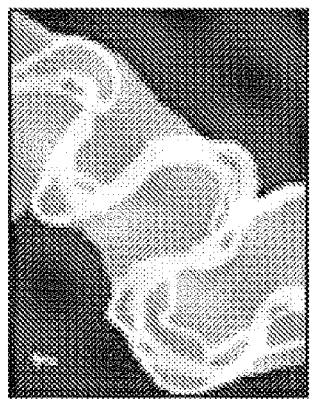

A reservoir grid (FIG. 2) is a 3D grid in which the topology reproduces that of a reservoir located within an area of the subsoil. The shape of the reservoir grid is defined by horizons which have been identified in seismic two- or three-dimensional images. Techniques for identifying seismic horizons in 2D or 3D seismic images are well known. Horizons correspond to surfaces of the subsoil where a high seismic impedance contrast is observed. Horizons are related to changes in lithology and often correspond to bedding planes. Tectonic activity of the Earth has distorted these initially flat surfaces, forming faults and/or folds. Using these surfaces as a framework, the reservoir grid takes the geological structures into account. The cells of the reservoir grid are referenced by their position Ir, Jr, Kr in the reference system, where Kr is a layer index and Ir, Jr are position indexes for cells within each layer. FIG. 2 shows a relatively simple example of deformation in the reservoir grid. In practice, the layers often have more complex deformations, such as those of the layer shown in FIG. 11(a).

In general, the number of layers in the grid of the training image is less than the number of layers in the reservoir grid.

Figure 7:
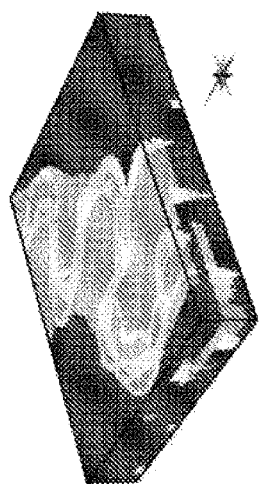
FIGS. 5 to 7 are diagrams illustrating the assembly of the 3D training image.
Figure 6:
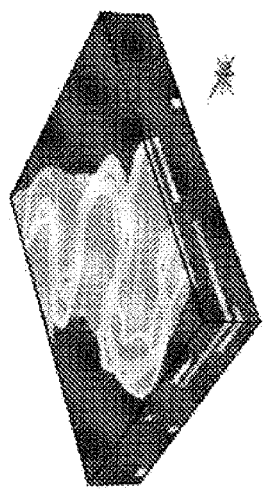

One embodiment of the method for preparing the training image for the purposes of MPS simulation of the subsoil area is presented in reference to FIG. 3. In the first phase (steps 10-11), 2D images are obtained, for example such as those illustrated in FIGS. 4A-E. Then a step 12 of 3D expansion is executed in order to assemble a training image, as illustrated by FIGS. 5-7.

In the example in FIG. 3, obtaining the 2D images begins by digitizing 10 some satellite images of an appropriate region of the globe. This region is chosen by geological experts for its assumed similarity, in terms of sedimentary behavior, to the region where the geological area to be studied was formed.

The semi-automatic digitization of satellite images by image processing techniques can quickly extract the parts of a photograph that are significant in terms of sedimentary bodies. These image processing techniques are based on algorithms such as the Canny edge detection (J. Canny, "A Computational Approach to Edge Detection", IEEE Transactions on Pattern Analysis and Machine Intelligence, Vol. PAMI-8, No. 6, November 1986, pp. 679-698) or segmentation by watershed transform (J. Roerdink and A. Meijster, "The Watershed Transform: Definitions, Algorithms and Parallelization Strategies" Fundamenta Informaticae, Vol. 41, 2002, p. 187-228). A 2D grid is created and filled with discrete facies values interpreted from satellite images using an image processing algorithm as mentioned above.

Figure 5:
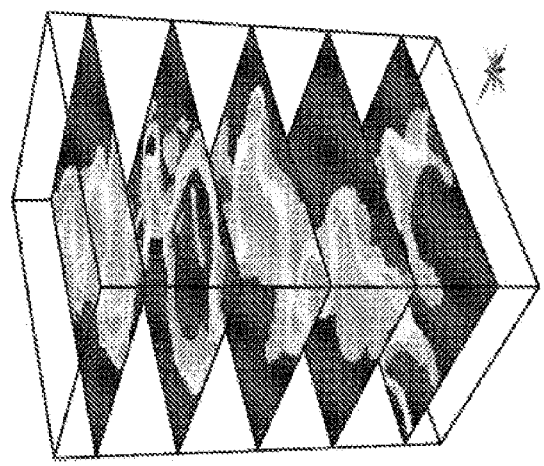

In step 12, the digitized 2D images are stacked vertically (FIG. 5). The result (FIG. 6) is a 3D image to which further processing, which may make use of a pseudocode-based algorithm, is applied in order to extrapolate the shape of the 3D geological body. This obtains a 3D training image, such as the one illustrated in FIG. 7, comprising for example on the order of 3 to 5 layers in the vertical direction K, and a few hundred cells in each horizontal direction I, J.

The training image is tested in step 13 to check whether it is stationary, or in other words whether it has spatial uniformity in terms of orientation or proportion of facies. If the image is not stationary, auxiliary training images representing spatial trends are generated from the training image. The auxiliary training images may include drifts in facies proportions, azimuths, sizes of the geological bodies. They are constructed semi-automatically in step 14, for example using the technique described in the aforementioned article by T. L. Chugunova & L. Y. Hu, and will thus allow conducting the MPS simulation in step 18 despite the fact that the training image is non-stationary.

In step 15 of FIG. 3, the 3D training image generated in step 13 is evaluated relative to the available data for one or more wells drilled in the reservoir area and for which measurements and samples were collected. A number of statistical criteria concerning consistency between the training image and the well data are evaluated. If one or more of these criteria are insufficiently met, the training image is discarded in step 16 and another training image will be generated, for example by modifying the previous training image or by starting over using a method 10-14 similar to the one described above. This other training image will be tested again, until a training image is obtained that is satisfactory for the criteria evaluated. Another possibility at the end of step 15 is to present the user with the results of evaluating the criteria concerned, to let the user decide, on the basis of the results, whether or not the training image can be accepted for the MPS simulation.

Step 15 may comprise an intra-well verification relating to multipoint statistics parallel to the wells. This may be carried out on the basis of distribution of runs, as illustrated by FIGS. 8A-B, or of the multipoint density function (MPDF), as shown in FIG. 9 (see the aforementioned article by J. B. Boisvert, J. Pyrcz and C. V. Deutsch).

Distribution of runs is a statistical measurement of the vertical extent of facies along a well. For each facies, the number of its consecutive blocks along the wells are counted. "Block" is understood here to mean the number of layers of the reservoir grid that the facies has where they intersect with the well. For example, in the well diagrammed in FIG. 8A, there is one run of 3 blocks, 2 runs of 2 blocks, and 4 runs of 1 block. The numbers found are indicated on a diagram such as the one in FIG. 8B, where the size of the runs is plotted on the abscissa. The same measurement is performed along the vertical columns of the training image defined on the regular grid of cells. The two diagrams are compared, and the distance between them gives an indication of the ability of the training image to account for the vertical extent of the facies along the wells. If the distance is too great, the training image may be rejected.

The multipoint density function (MPDF) is another multipoint statistical measurement along wells which can be estimated in step 15, on the one hand based on the well data of the reservoir grid, and on the other hand based on the training image along the vertical columns of the regular grid of cells. The MPDF is a count of the number of occurrences of the different 1D facies patterns along the wells. FIG. 9 shows a simplified representation of the case of three-layer patterns in two types of facies. A comparison of the number of occurrences of the different patterns along the well and in the training image thus allows assessing the statistical significance of the training image in order to inform the user or reject the training image if necessary.

Step 15 may further include an inter-well verification whose purpose is to verify that the training image has, along its layers I, J, two-dimensional facies patterns that correspond to the two-dimensional patterns observed in the wells along the geological horizons Ir, Jr of the reservoir grid.

To perform this inter-well verification, we first identify two-dimensional patterns in the well data. Each two-dimensional pattern is defined along any geological horizon. In a cell of the reservoir grid where there is the intersection of a well with the geological horizon considered, the two-dimensional pattern contains the type of geological facies that is estimated for the cell based on the recorded logs for the well or, if such is applicable, based on examination of the samples collected from the well.

Figure 10:
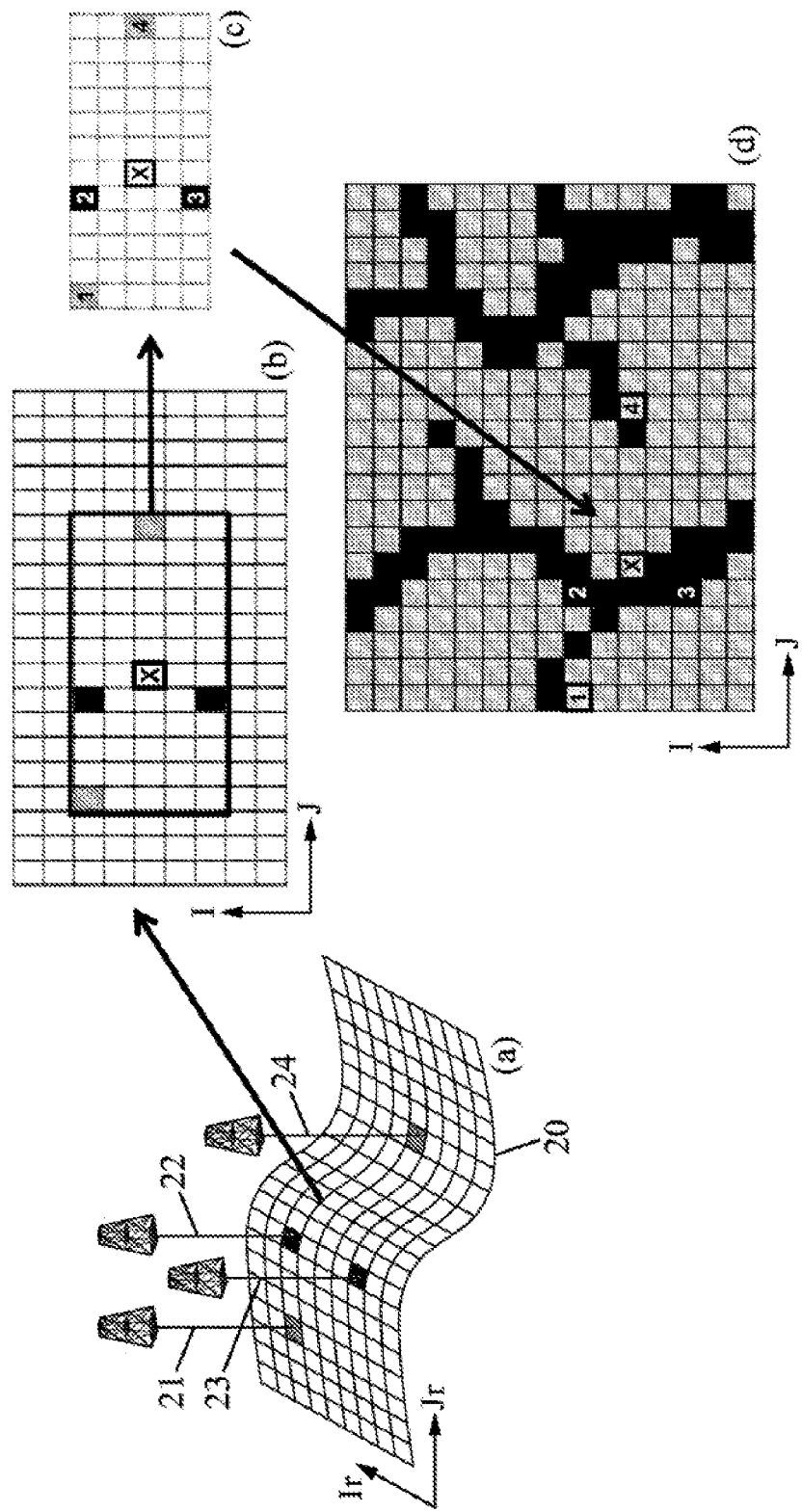
FIG. 10 illustrates one way of verifying the representativeness of the training image with respect to the well data.

For example FIG. 10(a) shows a seismic horizon 20 of the reservoir grid traversed by four wells 21-24. Four types of facies have been respectively determined on the seismic horizon 20 from measurements and samples collected in the four wells 21-24. Then, as shown in FIG. 10(b), the seismic horizon 20 is "flattened" to reorganize the indexes of these cells into the regular grid I, J while compensating for deformations in the seismic horizon. This allows extracting the two-dimensional pattern in the form shown in FIG. 10(c), where the four types of facies found in the wells are designated by the numbers 1-4. The location of this two-dimensional pattern, composed of several types of facies located in the wells, is indicated by the position of the cell of the regular grid that contains the centroid of the four wells, marked by an "X" in FIG. 10(*c*).

For each two-dimensional facies pattern which is extracted from well data in this manner, a scan is performed in order to count the occurrences of this two-dimensional pattern in the training image. For each layer (of index K) of the training image, the scan moves the two-dimensional pattern over the regular grid. In each successive stage of this movement (for example the step represented in FIG. 10(*d*) for one of the layers of the training image), the cell containing the centroid X of the wells is aligned with a reference cell of the grid of the training image, while the cells that compose the two-dimensional pattern are aligned with target cells of the grid of the training image. If the types of facies that the training image contains in these four target cells coincide with those of the two-dimensional pattern, a counter is incremented.

At the end of this operation, the counter value is compared to the number of positions scanned, and the ratio between this counter and this number is used to assess the ability of the training image to account for correlations between wells along seismic horizons in the context of inter-well verification.

Figure 11:
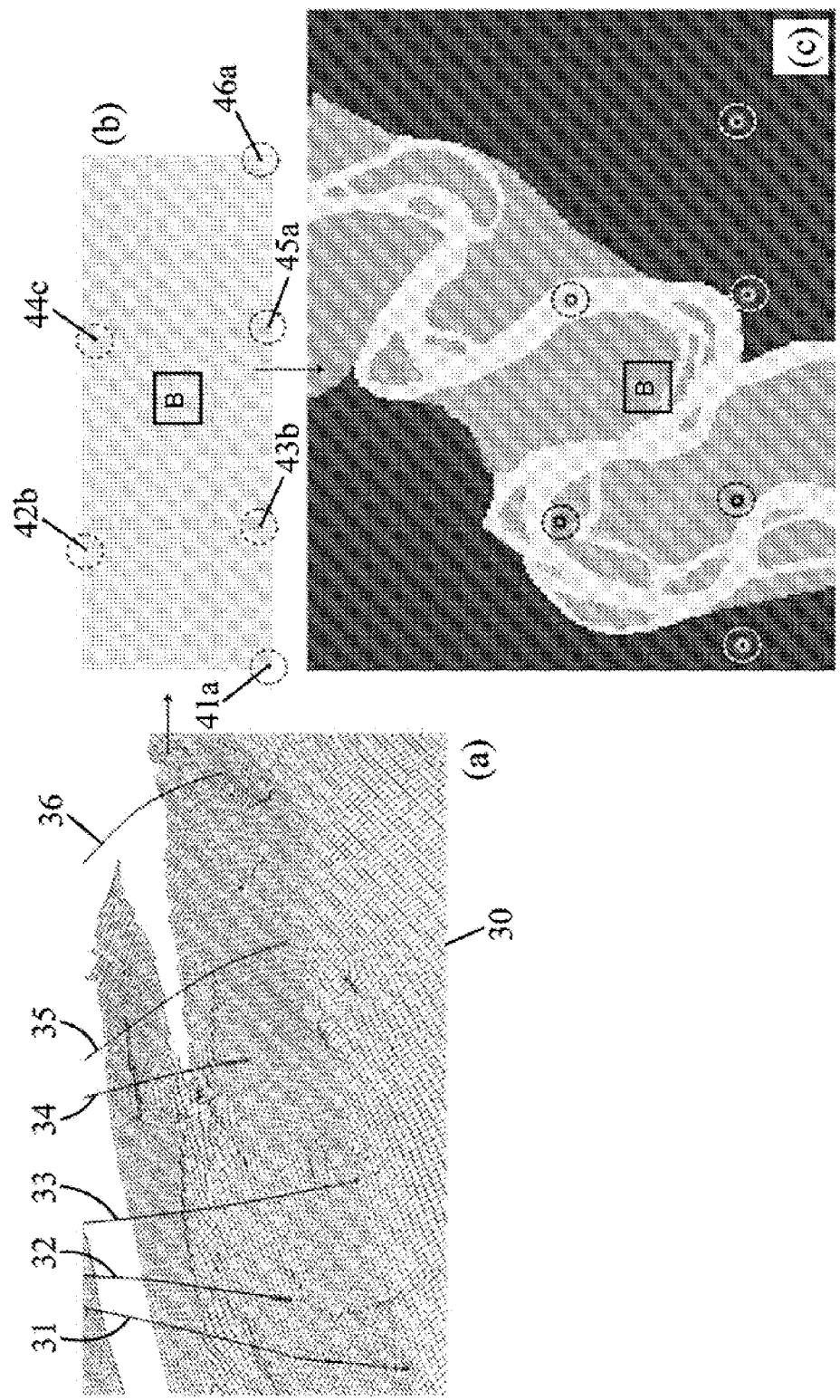
FIG. 11 is another illustration of verifying the representativeness of the training image with respect to the well data.

FIG. 11(*a*) shows another, more complex example of a seismic horizon 30 traversed by six wells 31-36 drilled in the study area of the subsoil. FIG. 11(*b*) shows the same horizon 30 with the cells rearranged into a regular arrangement, thereby defining a two-dimensional pattern composed of six types of facies 41*a*, 42*b*, 43*b*, 44*c*, 45*a*, 46*a* respectively placed at the positions of the six wells 31-36 along the horizon, these positions having a general centroid B. In the notations used for illustrative purposes in FIG. 11(*b*), the suffix "a" indicates the "alluvial plain" type of facies found at the horizon in wells 31, 35 and 36, the suffix "b" indicates the "sandy deposit" type of facies found at the horizon in wells 32 and 33, and the suffix "c" indicates the "channel" type of facies found in well 44 in the specific example of the horizon 30 in FIG. 11(*a*). This two-dimensional pattern of six types of facies occurs in the layer of the training image shown in FIG. 11(*c*) when the centroid B is positioned as shown.

Figure 12:
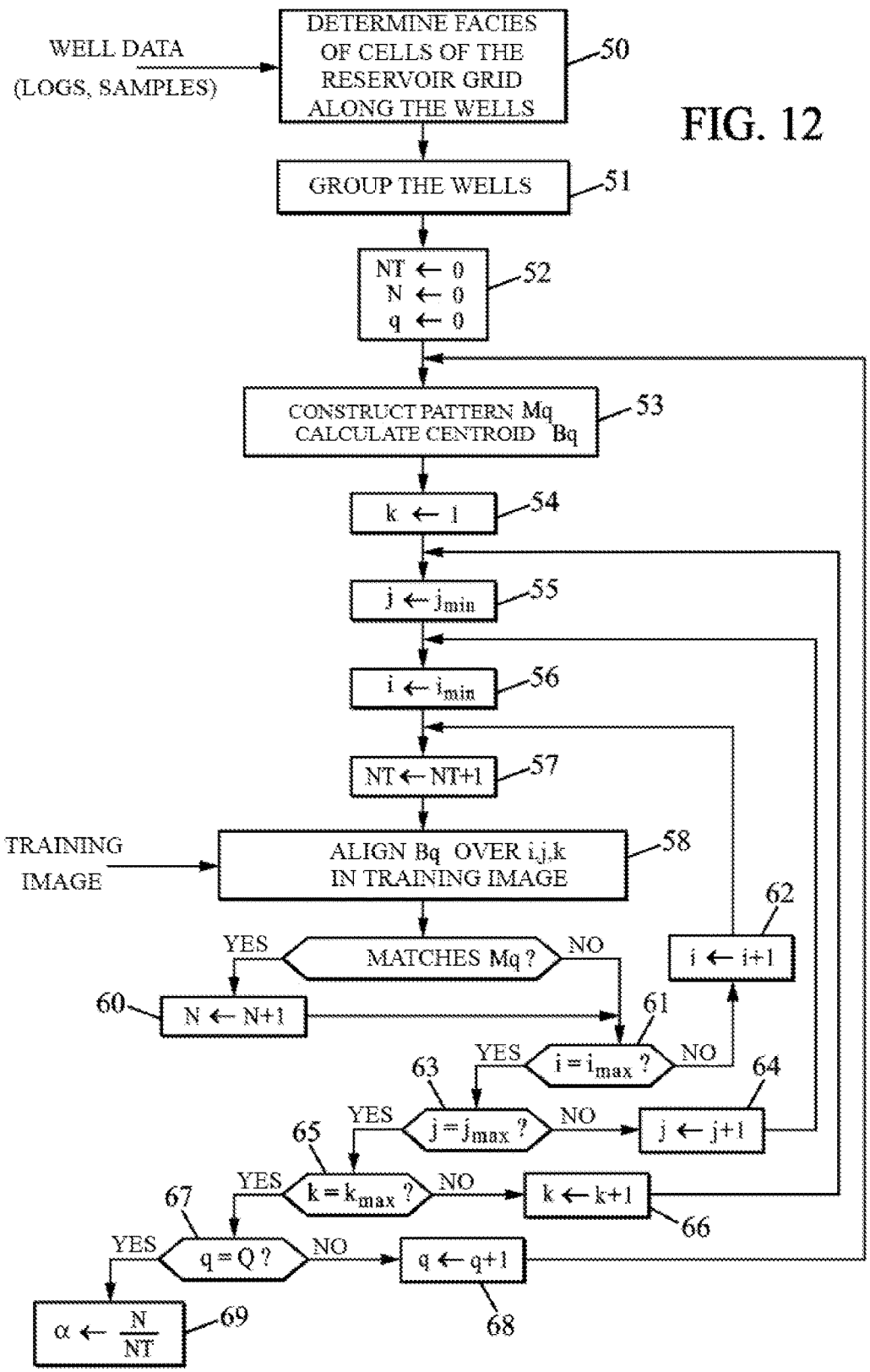
FIG. 12 is a flowchart of an example procedure that can be applied in an inter-well verification of a training image.

FIG. 12 shows a possible flowchart of a procedure for inter-well verification in one embodiment of the invention. In a first step 50, the well data, which may include logs and/or rock samples, are analyzed in order to associate the respective types of facies with the cells of the reservoir grid which are located along the wells drilled in the area of interest. The analysis may consist of assigning to a particular cell the type of facies that is preponderant in the samples collected in this cell, or may take into account physical measurements made in the well. The types of facies positioned on the wells in this manner could be used later on, in step 18 of FIG. 3, to initiate the MPS simulation.

Next (step 51), the neighboring wells are grouped to form one or more groups each consisting of M wells (M≥2). The number M may vary from one group to another. Step 51 can be performed manually by a user, or it can be partly automated using a criterion for the horizontal distance between wells.

The counting of occurrences of two-dimensional patterns is then initialized in step 52, for example by assigning zero values to the counters NT and N and the value 1 to the pattern index q. A pattern $M_q$ is constructed in step 53 in the manner illustrated above with reference to FIGS. 10(*c*) and 11(*b*). The pattern $M_q$ consists of a number M of types of facies arranged on a regular 2D grid. The locations of these types of facies are then identified by their relative positions with respect to the centroid Bq, also calculated in step 53, between the positions of the wells of the group concerned on the regular 2D grid.

Three nested loops are then executed to scan the training image in order to detect occurrences of the pattern $M_q$ just constructed. These three loops are successively initialized in steps 54, 55 and 56 where the indexes k, j and i are respectively initialized to the values 1, $j_{min}$ and $i_{min}$. The index k numbers the layers of the training image, while the indexes i, j number the cells along the two dimensions of the layers. The values $i_{min}$ and $j_{min}$ are chosen as a function of the size of the pattern $M_q$ so that this pattern can be completely superimposed on the layer concerned of the training image. At each position of a reference cell i, j, k during scanning, the counter NT is incremented by one in step 57. In step 58, the position of the centroid $B_q$ is aligned to that i, j, k of the current reference cell in the training image, which allows verifying in step 59 whether the pattern $M_q$ matches the types of facies encountered in the training image at the corresponding positions of the target cells. When there is a match, an occurrence of pattern $M_q$ is detected and the counter N is incremented by one in step 60. After step 60, or in case of a non-match of the pattern in step 59, an end loop test 61 is performed to compare the index i to its maximum value $i_{max}$ (again dependent on the size of the pattern $M_q$). If i<$i_{max}$, the index i is incremented by one in step 62 and an additional iteration of the inner loop is performed starting from step 57. When i=$i_{max}$ in test 61, a second end loop test 63 is performed to compare the index j to its maximum value $j_{max}$ (dependent on the size of the pattern $M_q$). If j<$j_{max}$, the index j is incremented by one in step 64 and an additional iteration is performed starting from step 56. When j=$j_{max}$ in test 63, a third end loop test 65 is performed to compare the layer index k to its maximum value $k_{max}$ (number of layers in the training image). If k<$k_{max}$, the layer index k is incremented by one in step 66 and an additional iteration is performed starting from step 55 in order to scan the new layer. When k=$k_{max}$ in test 65, test 67 examines whether all the patterns $M_q$ were searched for in the training image, meaning whether the pattern index q is equal to the possible number of patterns (equal to the number of groups selected in step 51 multiplied by the number of layers in the reservoir grid). If q<Q, the index q is incremented by one in step 68 and the algorithm returns to step 53 in order to construct the next pattern. The scans of the training image are ended when q=Q in test 67.

At this point, the numbers N and NT are compared, for example by calculating their ratio α=N/NT in step 69.

The value of this ratio α provides information on the likelihood of encountering in the training image the 2D facies patterns which can be determined between adjacent wells, based on the measurements. The highest values of α allow validating the training image from this point of view, while the lowest values are more likely to result in rejecting the training image. The evaluation may include comparing α to a predefined threshold, for example on the order of a few %. It may also consist of presenting the user with a score, proportional to α, which the user could take into account in conjunction with other scores, resulting for example from intra-well verifications such as those illustrated in reference to FIGS. 8 and 9.

Alternatively, the ratio a can be calculated for each group of wells formed in step 51. The comparison threshold for inter-well verification can depend on the number of wells in that group.

Returning to FIG. 3, when the training image has been validated after the intra- and inter-well verifications of step 15, the next step 17 is to ensure that connectivity between wells is respected. When exploring a region of the subsoil where wells have been drilled, or during oil production in this region, engineers collect dynamic data that provide information on communications between wells that allow fluid to flow between them. This information may result from interference tests or simply from observations of pressures and flows over time. Step 17 takes these observations into account in order to initialize the MPS simulation performed in step 18.

Dynamic observations provide hard information on communication between wells. These communications reveal the existence of flow paths between wells, composed of relatively permeable rock. Good incorporation of inter-well connectivity greatly improves the flow simulations.

Figure 13:
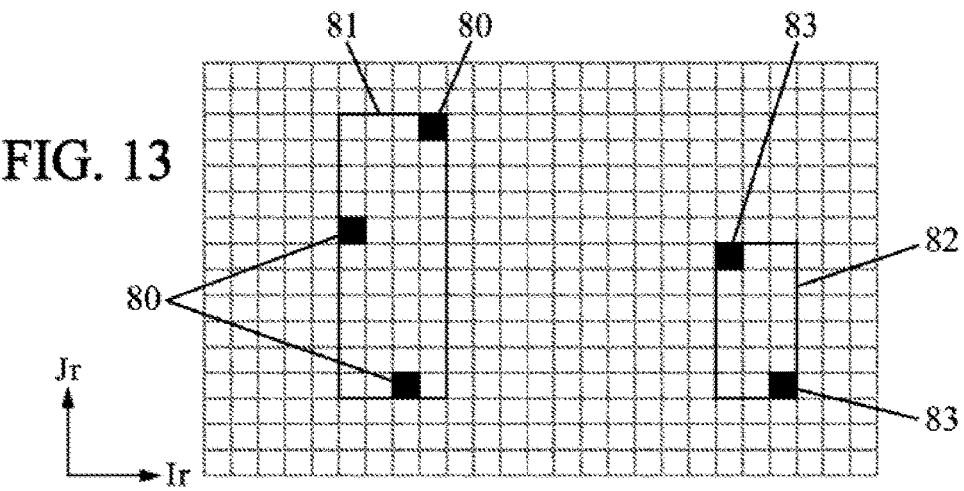
FIGS. 13 to 15 are diagrams illustrating a technique for taking into account the information on connectivity between wells in the initialization of an MPS simulation.

By way of example, FIG. 13 shows two groups of cells contained in the same layer of the reservoir grid, namely a first group of three cells 80 contained in a rectangular array 81 and a second group of two cells 83 contained in a rectangular array 82. In FIG. 13, the layer of the reservoir grid is represented as being flat, for a constant layer index Kr and for variable horizontal position indexes Ir, Jr. The three cells 80 of the group contained in rectangular array 81 are located at the intersection of the layer of the reservoir grid with the wells of a group of three communicating wells. Similarly, the two cells 83 of the group contained in rectangular array 82 are located at the intersection of the layer of the reservoir grid with the wells of another group of two communicating wells.

Identification of such groups of communicating wells is done in step 90, illustrated in FIG. 16. Connectivity is observed between different cells belonging to multiple wells of the group based on dynamic observations made inside these wells during testing or exploitation. To facilitate reading FIGS. 13-15, the cells of a group are represented as belonging to the same layer of the reservoir grid. However, it is understood that they may be located in different layers, in which case the rectangular arrays 81, 82 are generalized to become parallelepiped arrays.

For a group g of cells of the reservoir grid which are located along multiple wells, with hydrodynamic communications having been observed between said cells, the horizontal dimensions of the smallest parallelepiped array 81, 82 containing these cells are denoted $i_g$, $j_g$, and the vertical dimension of this array is denoted $k_g$. In the example in FIG. 13, we have $i_g=4$, $j_g=11$, $k_g=1$ for array 81, and $i_g=3$, $j_g=6$, $k_g=1$ for array 82.

For each group of cells of the reservoir grid identified in step 90 of FIG. 16 as allowing wells to intercommunicate, the processing uses a rectangular window 84, or parallelepiped window if $k_g>1$, that travels over the training image when scanning 91-104. The rectangular window 84 shown in FIG. 14 corresponds to the rectangular array 81 of FIG. 13. The positions 85 which correspond, in the reservoir grid, to the positions of the cells 80 of the group identified in step 90 are marked in this window 84.

The scan 91-104 consists of looking for rectangular or parallelepiped thumbnails compatible with the group of cells 80. These compatible thumbnails are connected sets of cells of the regular grid that satisfy two conditions:

presenting in the training image, at the marked positions 85 corresponding to the cells 80 in the group, the same respective types of facies as those determined in the wells for these cells 80, and including a connected subset of cells to which belong the cells located at the marked positions 85 and presenting permeable types of facies in the training image, meaning facies which allow fluid to flow between the cells of the group.

In this manner, we can distinguish between at least two families of facies in the modeling: a family of relatively permeable facies (first family, for example channel or sandy deposit facies), allowing the flow of fluids such as oil or natural gas, and a family of less permeable facies (second family). It is the facies of the first family that must be found in the connected subsets in order to accept a compatible thumbnail.

Figure 14:
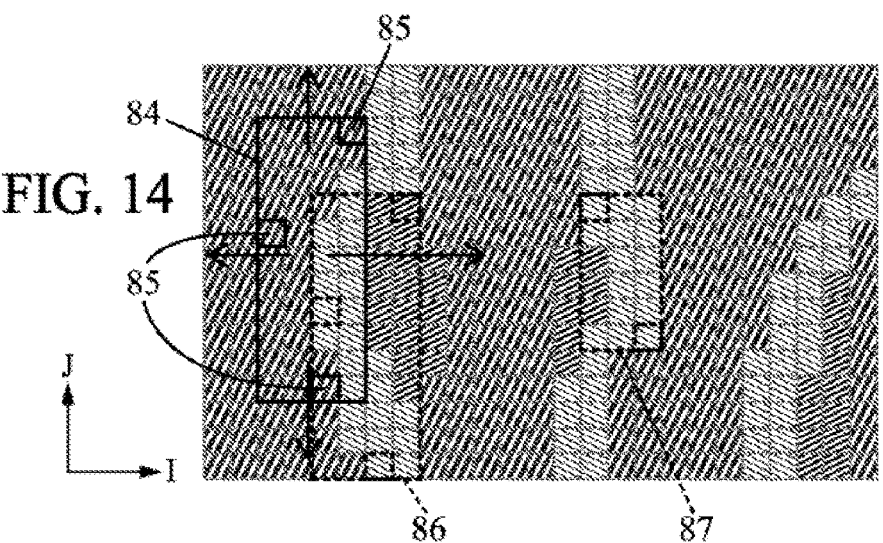

In FIG. 14, the darker squares represent cells having the facies of the second family, while the other squares represent cells having two types of facies of the first family. The reference 86 indicates the position where the rectangular window 84 is aligned with a set of cells compatible with the group of cells 80 of FIG. 13, while reference 87 indicates a set of cells compatible with the group of cells 83 of FIG. 13.

The scan 91-104 includes three nested loops that are successively initialized in steps 91, 92 and 93 where the indexes k, i and j are initialized to 1. The index k numbers the layers of the training image, while the indexes i, j number the cells along the two dimensions of the layers. At each position i, j, k during the scan, step 94 examines whether the connected set [i, $i+i_g$[×[j, $j+i_g$[×[k, $k+k_g$[ covered in the training image by the window, here in the form of a rectangular parallelepiped, allows communication between the cells labeled as corresponding to the cells of the group identified in step 90, in other words whether this rectangular parallelepiped has a connected subset of cells having permeable types of facies in the training image and including the marked cells. If so, a compatible thumbnail (or patch) in the form of a rectangular parallelepiped is detected in the training image and the number n of cells in this thumbnail [i, $i+i_g$[×[j, $j+i_g$[×[k, $k+k_g$[ for which the type of facies is permeable in the training image is counted in step 95.

This number of permeable cells in the compatible thumbnails detected in the training image is the object of a histogram calculation. The values H(1), H(2) . . . of the histogram H are initialized to 0 before step 91. After calculating the number n in step 95, the index c receives the value H(n)+1 in step 96 and the current position (i, j, k) of the scan is assigned to an index p(n, c) identifying the position of the c-th compatible thumbnail detected in the training image (step 97). The histogram is then updated in step 98, setting H(n)=c.

After step 98, or when the compatibility test 94 is negative, an end loop test 99 is performed to compare the index i to its maximum value $i_m$ ($i_m+i_g$ is the dimension of the training image in direction I). If $i<i_m$, the index i is incremented by one in step 100 and an additional iteration of the inner loop is performed starting from step 94. When $i=i_m$ in test 99, a second end loop test 101 is performed to compare the index j to its maximum value $j_m$ ($j_m+j_g$ is the dimension of the training image in direction J). If $j<j_m$, the index j is incremented by one in step 102 and an additional iteration is performed starting from step 93. When $j=j_m$ in test 101, a third end loop test 103 is performed to compare the layer index k to its maximum value $k_m$ ($k_m+k_g$ is the dimension of the training image in direction K). If $k<k_m$, the layer index k is incremented by one in step 104 and an additional iteration is performed starting from step 91. When $k=k_m$ in test 103, the scanning of the training image is ended.

The histogram H(n) for the group of wells concerned is then complete. It gives the number of compatible thumbnails found during scanning for each number n of permeable cells. It can be expressed in an equivalent manner in terms of volume of permeable facies (by multiplying n by the unit volume of a cell) or in terms of the proportion of permeable facies (by dividing n by $i_g \times j_g \times k_g$). This histogram can be used to select a compatible thumbnail which will be applied in the initialization of the MPS simulation in order to respect inter-well connectivity.

In the example in FIG. 16, the scanning of the training image for a group of connected wells is followed by a step 105 of selecting a number n (or in an equivalent manner a volume of permeable facies, or a proportion of permeable facies). This choice is made as a function of the statistics revealed by the histogram H(n). For example, one can choose for n the mean or median value of the distribution given by the histogram H(n). The choice may also take into account a scenario to be applied when executing the MPS simulation in step 18. For example, an optimistic scenario can lead to choosing a relatively high number n, while a pessimistic scenario can lead to choosing a relatively low number n.

In step 106, a compatible thumbnail is selected, for example randomly from among the thumbnails detected with the proportion of permeable facies chosen in step 105. This may consist of randomly selecting a number c and taking the selected thumbnail at position p(n, c) in the training image.

To initialize the MPS simulation of step 18 (FIG. 3), an initialization image is constructed on the reservoir grid by placing:

in the cells located along a well, the types of facies which have been determined by measurements or samples taken in the well;

in the cells located in the rectangles or parallelepipeds corresponding to a group of connected wells identified in step 90, the types of facies encountered in the training image in the corresponding cells of the selected thumbnail for this group.

Figure 15:
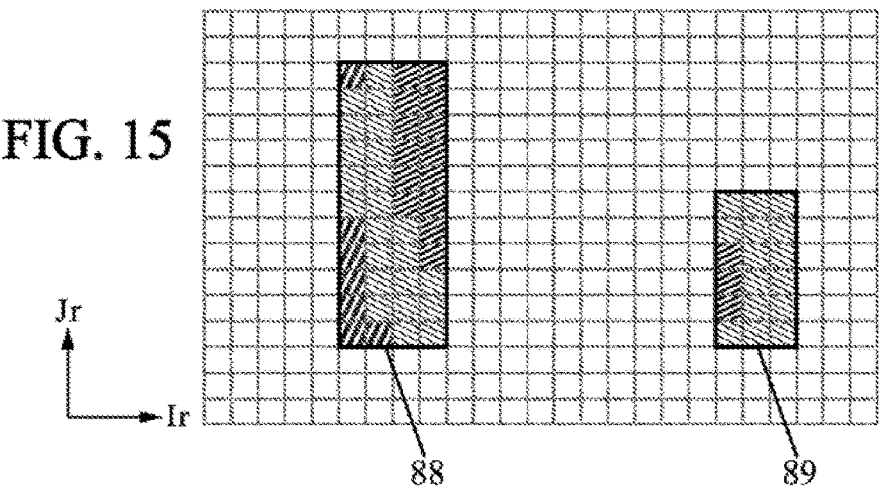

FIG. 15 shows a portion of the initialization image corresponding to FIGS. 13 and 14. This initialization image defined on the reservoir grid contains (i) a thumbnail 88 corresponding to thumbnail 86 of FIG. 14 set at the position of the group of three cells 80 contained in the rectangular array 81 of FIG. 13 and (ii) another thumbnail 89 corresponding to thumbnail 87 of FIG. 14 set at the position of the group of two cells 83 contained in the rectangular array 82 of FIG. 13.

In step 18, the MPS simulation is run in order to construct, on the reservoir grid, the image modeling the studied area of the subsoil. The MPS simulation proceeds in a known manner, by propagation from the initialization image while using the training image as a statistical reference.

The MPS simulation and the prior preparation of training images can be carried out using one or more computers. Each computer may include a processor, memory for storing data, a permanent storage system such as one or more hard drives, communication ports for managing communications with external devices, particularly in order to retrieve satellite images and well data, and user interfaces such as a screen, keyboard, mouse, etc.

Typically, the calculations and steps described above are executed by the processor or processors using software modules that may be stored in the form of program instructions or code readable by the computer and executable by the processor, on a computer-readable storage medium such as some form of read-only memory (ROM), random access memory (RAM), CD-ROMs, magnetic tapes, diskettes, and optical data storage devices.

The embodiments described above are illustrative of the present invention. Various modifications may be made to these embodiments without departing from the scope of the invention as defined in the appended claims.

The invention claimed is:

1. A method for exploring a subsoil area, the method comprising:

drilling a plurality of wells in the subsoil area;

conducting observations in the plurality of wells by collecting measurements and samples therein;

obtaining a well data based on the observations conducted in the wells, wherein the well data refer to a second three-dimensional grid of cells having a morphology based on estimated geological horizons in the subsoil area, and the well data include types of geological facies respectively estimated from the observations for the cells of the second three-dimensional grid located along the wells;

constructing, by a processor a training image on a first three-dimensional grid of cells, the training image giving, for each cell of the first three-dimensional grid, a respective type of geological facies assigned to said cell;

verifying, by the processor, representativeness of the training image with respect to the well data to produce a validated training image if representativeness is verified; and generating and displaying on a computer display a model representing the subsoil area using a multipoint geostatistical technique and the validated training image, wherein verifying representativeness of the training image with respect to the well data includes an inter-well verification which comprises:

identifying, by the processor, two-dimensional patterns in the well data, each two-dimensional pattern being defined along a respective geological horizon and including, in a cell containing an intersection of a well with said geological horizon in the second three-dimensional grid, the type of geological facies estimated for said cell; and counting, by the processor, in the training image, occurrences of the two-dimensional patterns identified.

2. The method as claimed in claim 1, wherein the inter-well verification further comprises:

validating, by the processor, the training image when a number of occurrences of the identified two-dimensional patterns counted in the training image exceeds a threshold.

3. The method as claimed in claim 2, wherein said threshold is expressed in proportion to a number of possible positions of the two-dimensional pattern in the training image.

4. The method as claimed in claim 1, wherein each two-dimensional pattern defined for wells intersecting a geological horizon is located via a position of a cell of the second three-dimensional grid containing a centroid of said wells along said geologic horizon.

5. The method as claimed in claim 4, wherein the counting, in the training image, of the occurrences of the two-dimensional pattern located via the position of the cell of the second three dimensional grid containing the centroid of said wells along said geologic horizon comprises:

scanning, by the processor, the training image, each scanning step placing the two-dimensional pattern on the first three-dimensional grid by aligning the cell containing the centroid of the wells over a reference cell of the first three-dimensional grid and the cells of the two-dimensional pattern respectively containing the intersections between the wells and the geological horizon over target cells of the first three-dimensional grid; and incrementing, by the processor, a counter each time a scanning step results in the types of facies estimated for the cells of the two-dimensional pattern coinciding with the types of facies respectively assigned to the target cells in the training image.

6. The method as claimed in claim 1, wherein verifying representativeness of the training image with respect to the well data further comprises an intra-well verification comprising:

estimating, by the processor, a first multipoint statistical measurement along each well in the well data;

estimating, by the processor, a second multipoint statistical measurement along vertical columns of the first three-dimensional grid of cells; and comparing, by the processor, the two estimated multipoint statistical measurements.

7. The method as claimed in claim 6, wherein each estimated multipoint statistical measurement is a multipoint density function (MPDF) or a distribution of runs.

\* \* \* \* \*